Dec. 17, 1968 S. L. ABBOTT 3,416,741

WINDING MACHINE

Filed April 6, 1967

Inventor
Samuel L. Abbott
by Roberts, Cushman & Grover
Att'ys

United States Patent Office 3,416,741
Patented Dec. 17, 1968

3,416,741

WINDING MACHINE

Samuel L. Abbott, Wilton, N.H., assignor to Abbott Machine Co., Inc., Wilton, N.H.

Filed Apr. 6, 1967, Ser. No. 628,858
11 Claims. (Cl. 242—18.1)

ABSTRACT OF THE DISCLOSURE

A driving connection for driving the cam shaft of the traversing mechanism of a winding machine wherein a wheel is mounted on the cam shaft, a tire is loosely mounted on the wheel so that it rotates slowly relative to the wheel when transmitting rotation to the wheel, a friction member normally transmitting rotation of the wheel to the shaft, and a cam on the tire movable therewith each time it travels by the friction member to disable it and thereby permit the cam shaft to slow down.

*Background of the invention*

Devices for dispersing ribbon formation in winding machines is old in the art and in particular such devices have beeen designed to effect dispersion by varying the speed of the package relative to the traversing cam or by permitting the package and roll to slow down together and then speeding up the traversing cam suddenly causing it to slip and lay the yarn at different positions. Such devices merely spread the pattern without breaking it up. Devices of this kind are shown, for example, in Patents Nos. 2,216,725, dated Oct. 8, 1940, 3,091,406, dated May 28, 1963 and 3,140,836, dated July 14, 1964. The purpose of the device herein illustrated is to effect a dispersion which does not itself merely create smaller patterns; to provide a device of the foregoing kind which can readily be attached to any standard winding head; to provide a device of the foregoing kind which does not require waving the roll; to provide a device of the foregoing kind which permits stopping the chain for repair of a head without stopping the roll; and to provide a device of the foregoing kind which is relatively easy to manufacture and maintain.

*Summary*

The winding unit with which the invention is illustrated is of the type which includes yarn traversing means, a shaft for effecting traversing movement of the traversing means and a tire for driving the shaft. In accordance with the invention, a wheel mounts the tire on the shaft for rotation about the axis of the shaft, the tire being frictionally mounted on the tire but slightly larger in diameter than the wheel so that while transmitting rotation to the wheel the latter rotates within the tire at a slightly faster angular speed than that of the tire. There is means normally transmitting the rotation of the wheel to the shaft and means operable periodically by relative movement of the tire on the wheel to disable the aforesaid means to permit the shaft to slow down. The tire is preferably cork and the means normally transmitting rotation from the wheel to the shaft comprises a lever pivotally mounted on the wheel with one end adjacent the shaft and the other end adjacent the tire. The end of the lever adjacent the shaft is provided with a shoe adapted to be held frictionally engaged with a cork sleeve on the shaft and the end adjacent the tire is weighted so that the centrifugal effect of the rotation of the wheel operating on the weighted end holds the end provided with the shoe against the sleeve. A cam is mounted on the tire with a portion extending inwardly to a position such that movement of the tire relative to the wheel periodically brings it into engagement with the weighted end of the lever, rotating the latter in a direction to disengage the shoe from the sleeve thereby permitting the shaft to slow down.

The invention will now be described with reference to the accompanying drawings wherein.

Figure 1:
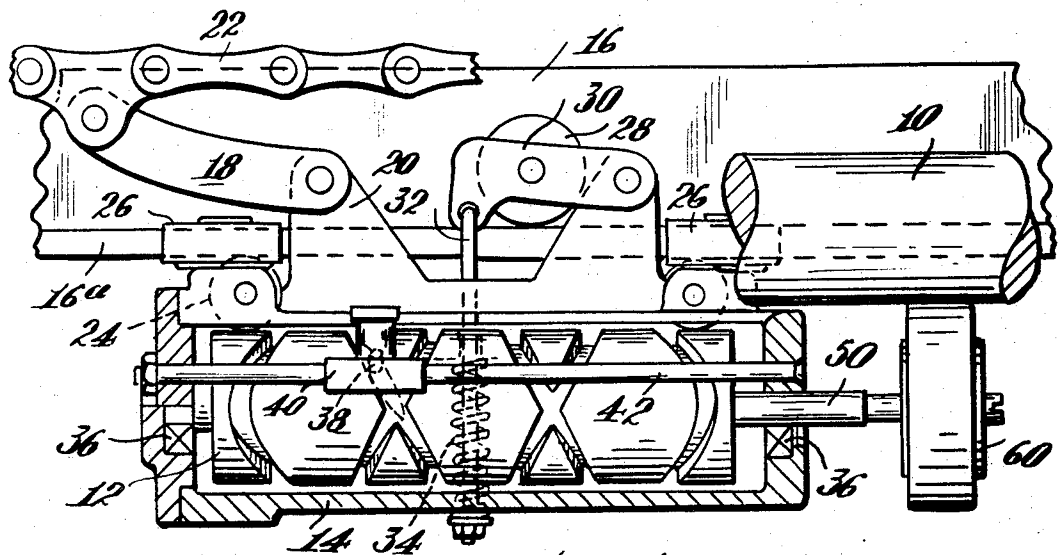
FIG. 1 is a plan view showing the head of a travelling winding unit and a portion of the package drive roll with parts removed and broken away to expose the yarn traversing means of the winding unit.
Figure 3:
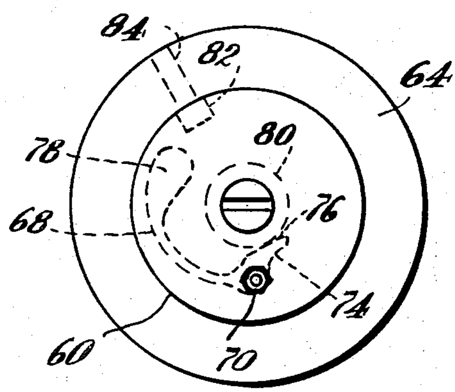
FIG. 3 is an elevation taken from the right side of FIG. 2 showing the connection in its operative position by means of which rotation of the package drive roll is imparted to the cam shaft.
Figure 2:
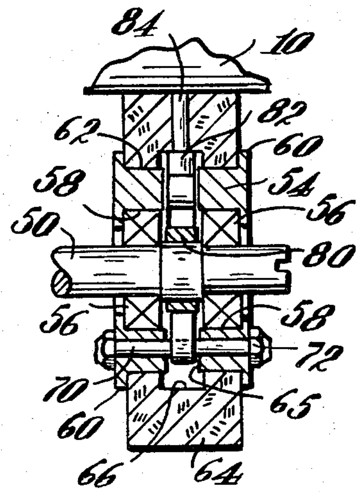
FIG. 2 is a sectional view showing the connection between the package drive roll and the traverse cam shaft.
Figure 4:
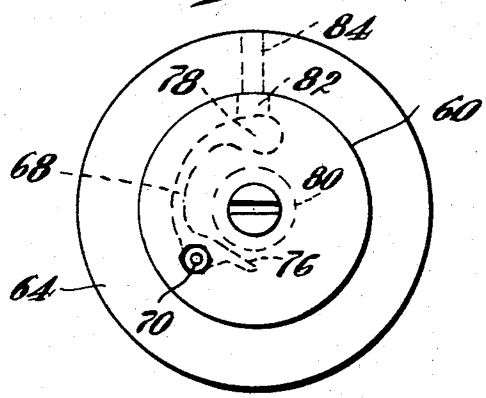
FIG. 4 is a corresponding view showing the connection disabled.

The spindle winder herein illustrated as is usual has a package drive roll 10 and means for traversing the yarn on the package as it is wound thereon comprising a traversing cam 12 supported in a housing 14, the latter being supported for movement parallel to the axis of the package drive roll on a rail 16, movement being effected by means of a drag link 18 connected at one end to a bracket 20 on the housing 14 and at its other end to a traveling chain 22. Rollers 24, 26 and 28 mounted on the housing 14 and engaged respectively with the underside, lateral edge and top side of a flange **16*a* at the lower edge of the beam guide and retain the housing in place during its movement. The roll 28 which engages the top side of the flange is supported by a pivoted lever 30, the distal end of which is connected to the upper end of a rod 32, the lower end of which extends downwardly through the bottom of the housing and has on it a spring 34** operative to hold the housing against the rail.

The traversing cam 12 is supported for rotation in bearings 36 at opposite ends of the housing and its rotation effects reciprocation of a cam follower 38 which in turn reciprocates a thread guide slider 40 mounted on a rod 42, the latter being fixed at its ends to the housing 14. The traversing cam is preferably comprised of a nonmetalic synthetic material which is light in weight and hence offers much less inertia than a metal cam and yet is of sufficient strength and wear resistance to insure prolonged use.

The traversing cam 12 has a cam shaft 50 by means of which it is rotated and rotation is effected by a driving connection with the package drive roll 10. The driving connection herein disclosed has for its purpose to effect random dispersion of the yarn in contrast to regular dispersement which only creates narrower ribbons. To this end a wheel 54 is rotatably mounted on the cam shaft 50, being supported thereon by ball bearing assemblies 56—56 mounted in a centrally located opening 58 in the wheel. The wheel has transversely spaced flanges 60—60 providing a peripheral annular groove 62 around it within which there is mounted a tire 64 comprised, for example, or cork. The inside diameter of the cork tire is frictionally engaged with the bottom of the groove 62 but is slightly larger in diameter than the diameter of the wheel at the bottom of the groove so that as the tire is rotated the wheel which is free to rotate within the tire rotates at a slightly faster rate than the tire in the direction of rotation of the tire. In other words, while the tire has sufficient intimate contact with the wheel to effect rotation of the latter, it is loose enough so that the two parts do not move at the same rate but always with the tire tending to lag slightly behind the wheel. In another way of stating this, the diameter of the wheel at the bottom of the groove is slightly smaller than the inside diameter of the tire, so that while there is sufficient friction between the two to transmit the rotation of the tire to the wheel, during such rotation of the tire and wheel the wheel rotates at a slightly faster rate in the direction of rotation than the tire. The relation between the tire and wheel is the same as that between external gears of different diameter, to wit, the ratio of the angular speed of rotation of the smaller gear is to the angular speed of the larger gear as the diameter of the larger gear is to the diameter of the smaller gear. This is expressed simply in the formula $Rw:Rt=Dt:Dw$ wherein $Rw$ is the angular speed of the wheel; $Rt$ is the angular speed of the tire; $Dt$ is the diameter of the tire; and $Dw$ is the diameter of the wheel. The relation is an inverse ratio in which the angular rotation of the wheel increases with its decrease in diameter or vice versa the angular rotation of the tire decreases relative to the wheel as its diameter increases. In the structure herein illustrated, the difference in diameters is very small so that there is substantial frictional engagement between the tire and the wheel all the way around and hence maximum driving engagement between the two. Nevertheless, there is sufficient difference in diameter to cause the wheel to rotate slowly within the tire.

While cork is specified it is, of course, within the scope of the invention to employ any suitable material which will afford driving friction between its outer peripheral surface and the package driving roll and driving friction between its inner peripheral surface and the peripheral surface of the wheel at the bottom of the groove.

The wheel contains a medially located, diametrically disposed slot 65 and the tire contains a medially disposed, internal annular groove 66 with which the ends of the diametrical slot in the wheel are in communication. A lever 68 is pivotally supported in the diametrical slot 65 on a pin 70 extending transversely through the wheel from one side to the other and secured in place by nuts 72 mounted on its opposite ends. The lever has a tail end 74 provided with a flat shoe 76 facing inwardly toward the axis of the cam shaft 50 and a head 78 substantially diametrically opposite it which moves around the axis of the shaft 50 relative to the tire 64 as the wheel is rotated by the tire. Under normal operating conditions centrifugal force developed by rotation of the wheel acts on the head 78 to move it away from the center of rotation and hence in an anticlockwise direction around its own center of rotation which is the axis of the pin 70. Movement in this direction moves the tail 74 toward the axis of the shaft, pressing the shoe into engagement with a cork sleeve 80 mounted on and secured to the cam shaft. Frictional engagement of the shoe 76 with the cork sleeve 80 is sufficient to transmit the rotation of the wheel to the cam shaft so long as the shoe 76 is held engaged therewith.

As related above, rotation of the package drive roll 10 effects rotation of the tire 64 and this in turn effects rotation of the wheel. However, the tire lags behind the wheel so that in effect the wheel rotates slowly inside the tire. The relative rotation of the tire and wheel is employed to actuate a cam member 82 mounted in the groove 66 at the inner end of a stem 84 fixed in a radially formed hole 86 in the tire. The came member (preferably nylon) is situated in the path in which the head 78 of the lever 68 travels about the axis of the shaft so that it depresses the lever with respect to the axis of the shaft each time the head of the lever travels by it, thus rotating the lever in a clockwise direction about its pivot. Rotation of the lever disengages the shoe 76 from the cork sleeve 80, and although this disengagement lasts only for a short time during this time the connection is disabled so that there is no drive between the wheel and the cam shaft and hence the latter slows down. As soon as the relative movement between the wheel and the tire carries the head of the lever beyond the cam member 82, the lever is returned to its operative position by centrifugal force and the drive is re-established. In actual practice it is found that the disengagement and re-engagement of the shoe with the sleeve on the cam shaft practically never occurs at the same position and hence no regular pattern of engagement and disengagement is ever established which would result in the formation of a definite pattern. In other words, the engagement and disengagement is at random and hence maximum dispersement of the yarn on the package is obtained. The random action of the device is, of course, increased by such varying factors in the drive as the amount of friction existing at any given time, the rate of rotation, the resistance to rotation, and the ambient conditions within which the apparatus is functioning. By proper selection of the tire and wheel diameters the periods of disengagement and re-engagement can be controlled. As thus constructed, the package is rotated at a constant speed at all times and the position fo the traversing cam is changed relative to it.

Optionally, the brake shoe 76 may be held engaged with the sleeve 80, for example, by a spring located between the head of the lever and the sleeve. If constructed in this manner the head 78 need not be enlarged to provide the weight necessary to hold it engaged by centrifugal action.

It should be understood that the present disclosure is for the purpose of illustration only and that this invention includes all modifications and equivalents falling within the scope of the appended claims.

I claim:

1. A winding machine of the type in which the winding unit includes yarn traversing means, a shaft for effecting traversing movement of the traversing means, and a tire for driving the shaft, characterized in that a part mounts the tire on the shaft for rotation about the axis of the shaft, said tire being frictionally mounted on said part for transmitting rotation thereto while permitting relative movement of the part and the tire, means normally transmitting the rotation imparted to the part to the shaft, and means operable periodically by relative movement of the part and tire to disable said last means to permit the shaft to slow down.

2. A winding machine according to claim 1, wherein the part is a wheel having an external diameter slightly smaller than the internal diameter of the tire.

3. A winding machine according to claim 1, comprising a cork tire.

4. A winding machine according to claim 1, wherein the means normally transmitting rotation to the shaft is a friction element held engaged with the shaft by centrifugal action.

5. A winding machine according to claim 1, wherein said means normally transmitting the rotation to the shaft comprises a lever pivotally mounted on the part with one end adjacent the shaft and the other end adjacent the tire, the latter end being weighted and operable by the centrifugal force developed by rotation of the wheel to hold the one end engaged with the shaft.

6. A winding machine according to claim 2, wherein the wheel rotates slightly faster than the tire, a friction element on the wheel normally frictionally transmits its rotation to the shaft, and there is means on the tire operable as the wheel turns within the tire periodically to disable said friction element to permit the shaft to slow down.

7. A winding machine according to claim 6, wherein there is a cork sleeve on the shaft with which the friction element on the wheel is held engaged.

8. A winding machine of the type in which the winding unit includes yarn traversing means, a shaft for effecting traversing movement of the traversing means, a flanged wheel rotatably mounted on the shaft, a tire frictionally mounted on the wheel for transmitting rotation thereto while permitting the wheel to turn within it, a lever pivotally mounted on the wheel with an end frictionally held against the shaft so that the rotation of the wheel is transmitted to the shaft and with its other end movable in a circular path about the axis of the shaft, and a cam on the tire movable therewith circularly about the shaft, said cam being operable by said relative movement to disable the lever each time the lever moves by it.

9. A winding machine according to claim 8, wherein a friction member is mounted on the shaft and said end of the lever has a shoe thereon for engagement with said friction member.

10. A winding machine of the type in which the winding unit includes yarn traversing means, a shaft for effecting traversing movement of the traversing means, and a tire for driving the shaft, characterized in that a flanged wheel is rotatably mounted on the shaft, the tire is frictionally mounted on the wheel for transmitting rotation thereto, said wheel being slightly smaller in diameter than the tire so that the wheel is free to rotate relative to the tire during rotation of the tire and wheel, said wheel containing a medially located, diametrical slot, a lever mounted in the slot on a pin spaced from and parallel to the axis of the shaft, said lever having a part adapted frictionally to transmit rotation of the wheel to the shaft, and a part movable circularly about the shaft, means normally holding the part engaged with the shaft, and a cam mounted on the tire and extending inwardly therefrom into said slot, said cam being operable as the wheel rotates within the tire by engagement with the lever to disable the lever as it passes the latter.

11. In a winding machine of the type in which the winding unit includes yarn traversing means and a shaft for effecting traversing movement of the traversing means, a driving element, and means drivably connecting the shaft to the driving element, said means comprising a wheel rotatably mounted on the shaft, means rotatable with the wheel for transmitting rotation of the wheel to the shaft, said means being adapted to be disabled, an annular friction element rotatably mounted on the wheel for rotation with and relative to the wheel, said friction element being held frictionally engaged with the driving element and with the wheel and being operable by rotation of the driving element to effect rotation of the friction element and wheel at different rates about the axis of the shaft, and means periodically operable by relative movement of the friction element and wheel to disable said means for transmitting rotation of the wheel to the shaft.

References Cited

UNITED STATES PATENTS

| | | | |
|---|---|---|---|
| 2,216,725 | 10/1940 | Abbott. | |
| 3,045,935 | 7/1962 | O'Brien | 242—18.1 |
| 3,091,406 | 5/1963 | Abbott | 242—35.5 |
| 3,140,836 | 7/1964 | Abbott | 242—18.1 |

STANLEY N. GILREATH, *Primary Examiner.*